Jan. 9, 1945.  F. Q. RAST  2,366,872
TIME RECORDER
Original Filed July 7, 1938  11 Sheets-Sheet 1

INVENTOR
Frederick Q. Rast
BY
W. M. Wilson
ATTORNEY

Jan. 9, 1945.　　　　F. Q. RAST　　　　2,366,872
TIME RECORDER
Original Filed July 7, 1938　　11 Sheets-Sheet 4

FIG.5.

Jan. 9, 1945.  F. Q. RAST  2,366,872
TIME RECORDER
Original Filed July 7, 1938  11 Sheets-Sheet 5

INVENTOR
Frederick Q. Rast
BY
W. M. Wilson
ATTORNEY

Jan. 9, 1945. F. Q. RAST 2,366,872
TIME RECORDER
Original Filed July 7, 1938 11 Sheets-Sheet 6

INVENTOR
Frederick Q. Rast
BY
W. M. Wilson
ATTORNEY

Jan. 9, 1945.     F. Q. RAST     2,366,872

TIME RECORDER

Original Filed July 7, 1938     11 Sheets-Sheet 9

INVENTOR
Frederick Q. Rast
BY
W. M. Wilson
ATTORNEY

Jan. 9, 1945. F. Q. RAST 2,366,872
TIME RECORDER
Original Filed July 7, 1938 11 Sheets-Sheet 10

INVENTOR
Frederick Q. Rast
BY
W. M. Wilson
ATTORNEY

Jan. 9, 1945.  F. Q. RAST  2,366,872
TIME RECORDER
Original Filed July 7, 1938   11 Sheets-Sheet 11

INVENTOR
Frederick Q. Rast
BY
W. M. Wilson
ATTORNEY

Patented Jan. 9, 1945

2,366,872

UNITED STATES PATENT OFFICE 2,366,872

TIME RECORDER

Frederick Q. Rast, Binghamton, N. Y., assignor to International Business Machines Corporation, New York, N. Y., a corporation of New York Application January 26, 1940, Serial No. 315,732, which is a division of application Serial No. 217,955, July 7, 1938. Divided and this application September 22, 1942, Serial No. 459,261

9 Claims. (Cl. 234—43)

This invention relates to time recorders, and particularly to recorders of the type in which a card is inserted to receive an automatic time registration thereon.

The present application is a division of my application, Serial No. 315,732, filed January 26, 1940, now Patent No. 2,335,964 and which in turn is a division of my original application, Serial No. 217,955, filed July 7, 1938, now Patent No. 2,281,998. The claims of the patent are directed to the program mechanism, while the claims of the pending application relate to the printing mechanism. The present application pertains to the card holder and its control over the printing mechanism.

One object of the invention is to provide a time recorder having a card holder normally positioned by program mechanism, which can, however, be moved freely to an out-of-program position, but in so moving disables the printing mechanism, until the card holder is returned to in-program position.

Another object is to provide a machine of the kind described, in which the card holder, after being moved to an out-of-program position, will return automatically to in-program position, when released, and in so doing will restore the printing mechanism to operative condition.

In a preferred embodiment key operated means are provided to block out the disabling means, to permit authorized out-of-program printing.

Another object is to provide a time recording machine having a laterally movable card holder, and printing mechanism, the operation of which is dependent upon the joint control of means to insure the location of the card holder in any one of several distinct laterally spaced positions and means preventing operation of the printing mechanism unless the card holder is in a particular one of said laterally spaced positions determined by program mechanism; the second control being subject to release by setting means to permit out-of-program printing. Thus, the out-of-program printing is still subject to the first control, insuring correct registration of the card with respect to the printing members.

In a preferred embodiment of the invention the card holder is mounted on a two-part carriage, the parts being relatively movable by shifting of the card holder laterally, and by their relative movement disabling the printing mechanism.

Still another object is to provide means cooperating with an adjustable card receiver assembly to adapt the machine for different width time cards.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a view of the machine in perspective with the cover on.

Figure 1:
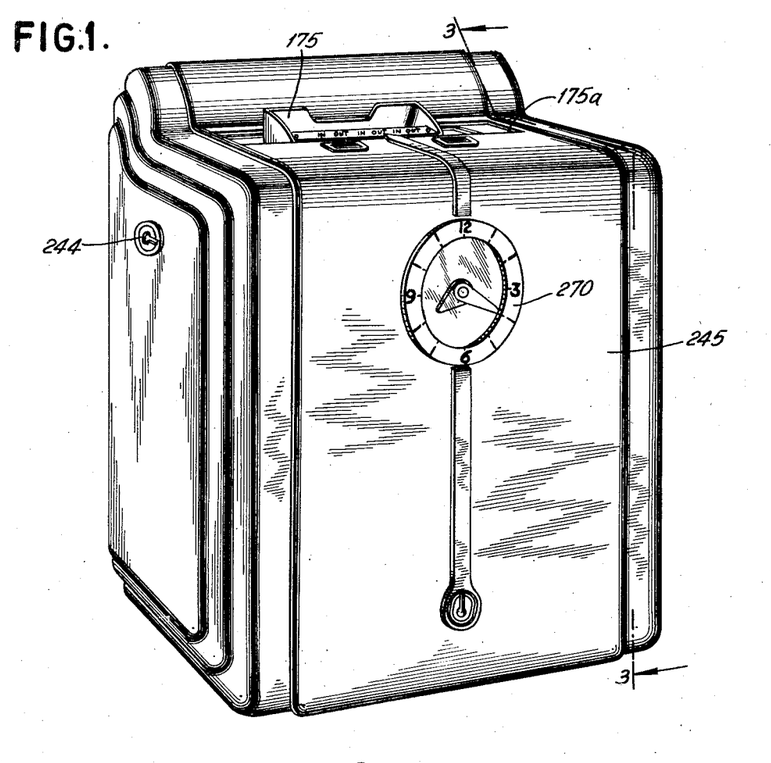

Referring first to Fig. 1, a preferred embodiment of the invention is shown, housed in a casing 245 with a clock 270 on its front wall and a card holder 175 projecting up through a slot 175a in its top wall. In the left wall of the casing is a lock 244 to receive a key for setting the machine to print with the card holder in out-of-program position, as will be described in detail later.

The card holder 175 is part of an assembly shown in detail in Figs. 9 and 14-21. The card holder proper comprises a mouthpiece 300 (Fig. 16) fixed by screws 301 to a bracket 250, which is fastened to the rear side of a plate 177. The plate 177 has rearwardly extending slotted ears 177a and 177b, by which it is slidably mounted on a stationary bar 240 supported by side plates 307 and 308 of the machine frame. Two vertical bars 237 and 238, secured by screws 302 to the front side of plate 177, are provided with channel flanges 273a, 237b and 238a, 238b, to guide the card C to printing position, as it descends through the slot 300a of the mouth piece. The bottom ends of the bars 237 and 238 are tied together by a bar 303, which is fastened by screws 304 to lugs 305 on the vertical bars. Extra holes 176 are provided in the plate 177 and bar 303, so that the bar 237 can be moved nearer to the bar 238 for cards of smaller width. A lug 303a on the bar 303, and the bottom ends of the bars 237 and 238 guide the bottom of the card holder frame on a stationary rod 306.

Figure 3:
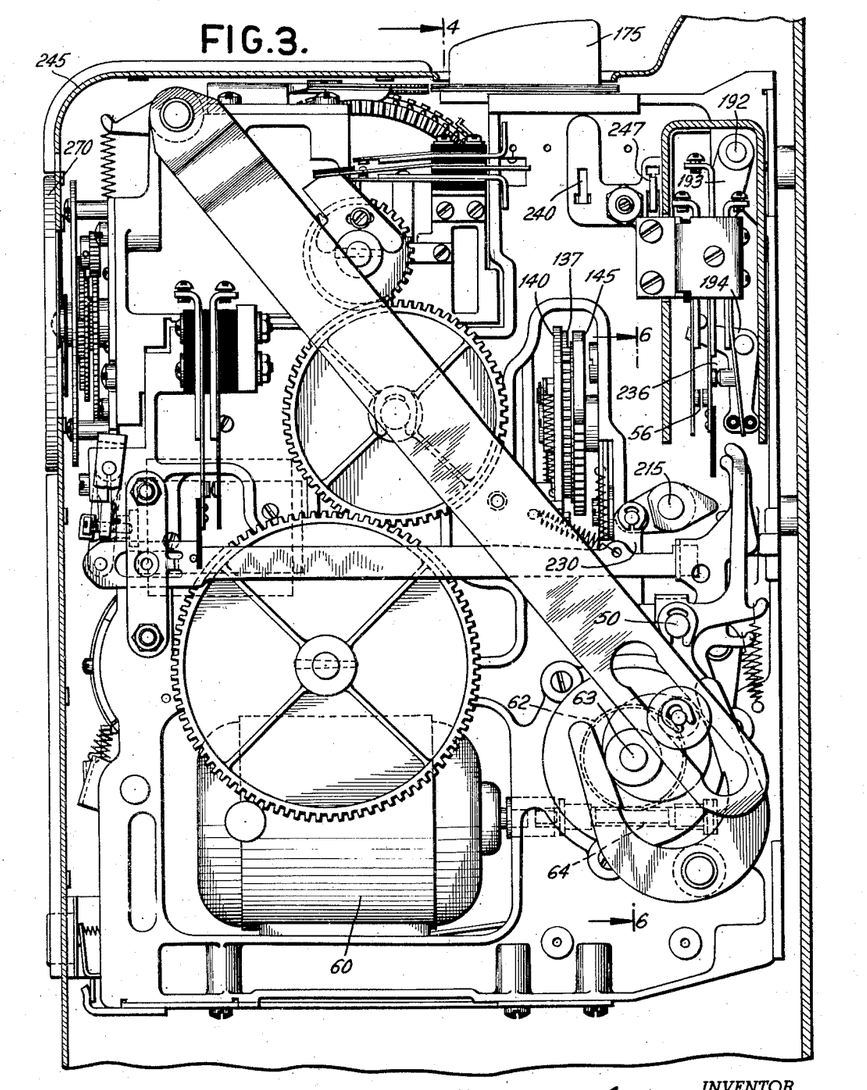
Fig. 3 is a sectional view taken generally on the line 3—3 of Fig. 1, in the direction indicated by the arrows.
Figure 5:
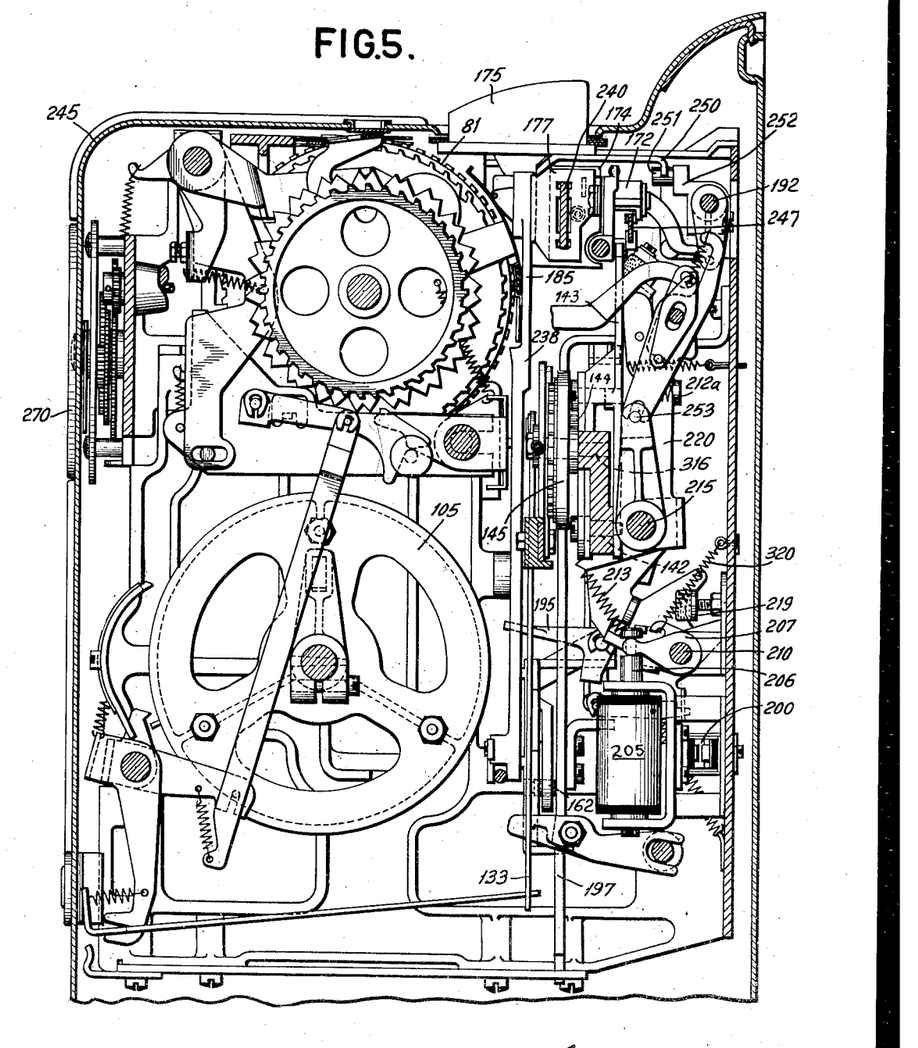
Fig. 5 is a section on the line 5—5 of Fig. 4.

A second plate 174, similar to the plate 177, is guided by slotted ears, 174a and 174b on the bar 240. The two plates 174 and 177 are normally held together, with their ears 174a and 177a in contact, by a spring 173 stretched between the ears 174a and 177b. The plates 174 and 177 constitute a two-part carriage, designated generally by reference number 150; the carriage being slidable on the bar 240 to shift the card holder laterally. It is biased toward the right by a spring 146, its right hand limit position being determined by a set screw 148 abutting a lug 172a of a rock lever 172 pivoted by a pin 310 upon the plate 174. The lever 172 has a lug 172c abutting against the bottom edge of the plate 174, to limit the clockwise movement of the lever 172. The leftward movement of the carriage 150 to successive program positions is effected by an arm 143 bearing against a stud 149 on rock lever 172 and pivoted by a stud 142 (Fig. 7) upon a bracket 141. The arm 143 has fixed to it a cam follower 144, which is biased by a spring 315 against a stepped cam 145. The cam has fixed to it a ratchet wheel 140 and the unit is revolubly mounted upon a stud 316 supported by the bracket 141. Rockably mounted on the stud 316 beside the ratchet wheel 140 is a pawl carrier 138 having pivoted thereon a pawl 137 engaging the ratchet wheel 140. The pawl carrier is biased by a spring 139 in clockwise direction so that its arm 138a normally rests upon a portion 308a of the frame. The pawl carrier is rocked counterclockwise by a link 133 reciprocated at intervals by the motor 60 (Fig. 3) under control of the program drum 105 (Fig. 5). For a detailed description of the mechanism which reciprocates the link 133 at the proper time, reference is made to my Patent No. 2,281,998. By this mechanism the cam 145 is turned step by step in counterclockwise direction at the times determined by the program setting of the program drum, and at each step the carriage 150 is moved one position further to the left.

The cam 145 is a double lobe cam and each lobe has eight steps around its periphery, the steps being indicated by the reference character 145a. The eight steps of each lobe correspond, respectively, to the maximum number of horizontal printing positions of the card holder normally required. In fact, the customary number of horizontal positions is six, these being, respectively: "morning in," "noon out," "noon in," "night out," "extra in," and "extra out." If the number of horizontally displaced registering positions on the time card is only six instead of eight, as in the embodiment shown herein, the adjustable stop 148 serves to position the card in an initial position at which it would have arrived after two movements of the cam, if the stop had been in the position shown in the drawings. Thus, the first two movements of the cam 145 under these conditions do not impart any movement to the carriage 150. The third to eighth movements of the cam, however, do move the carriage to six different horizontal positions. When a card of less than eight positions is being used, the width of the card receiver is decreased to take care of the smaller width of card. This is done by moving the left guide bar 237 (Fig. 14) of the card receiver to the right and fastening it in the proper place as determined by the screw holes 176 in the plate 177 and bar 303.

The part of the carriage composed of the plate 174 and associated members will be sometimes referred to herein as the positioning part of the carriage, since it cooperates with the program member 143 to determine the in-program position of the carriage; whereas the plate 177 and associated members including the card holding channels, will be referred to as the card holding part of the carriage.

Figure 4:
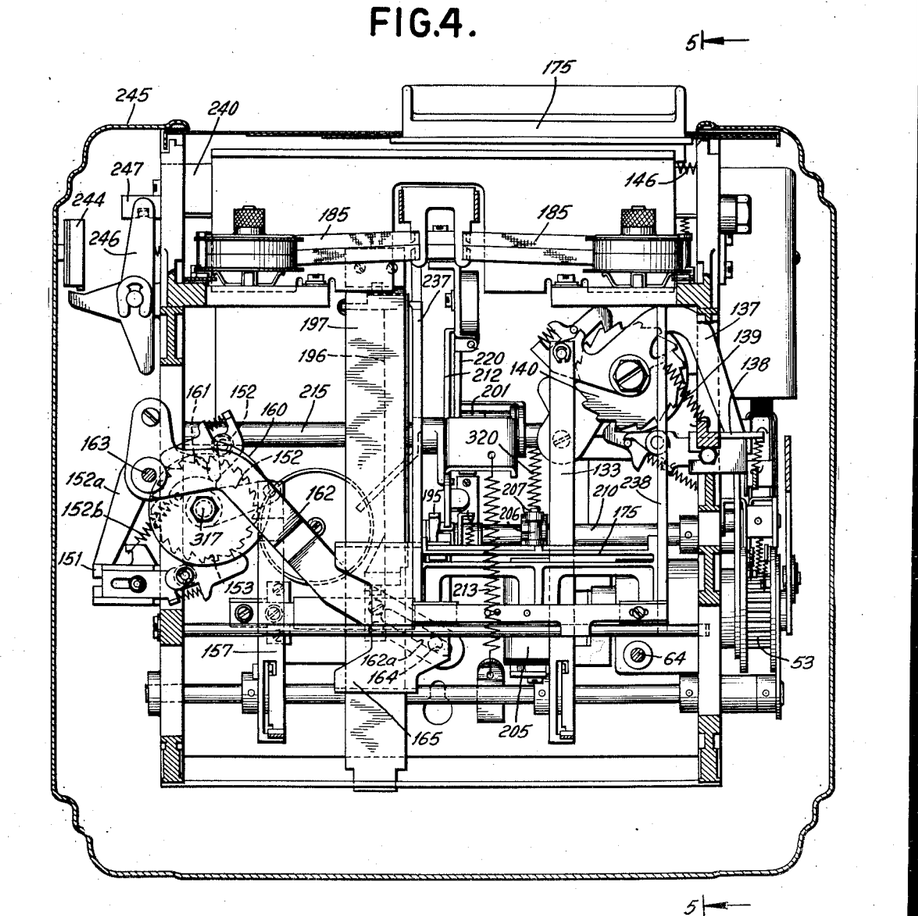
Fig. 4 is a sectional view taken on the line 4—4 of Fig. 3, on a slightly reduced scale.
Figure 9:
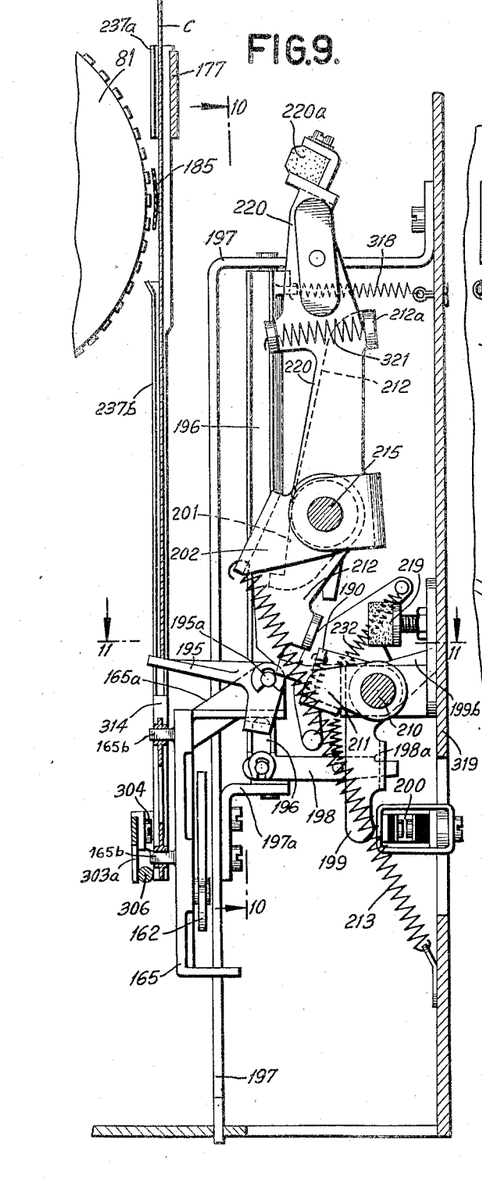
Fig. 9 is a side elevation, partly in section, of the printing mechanism.
Figure 10:
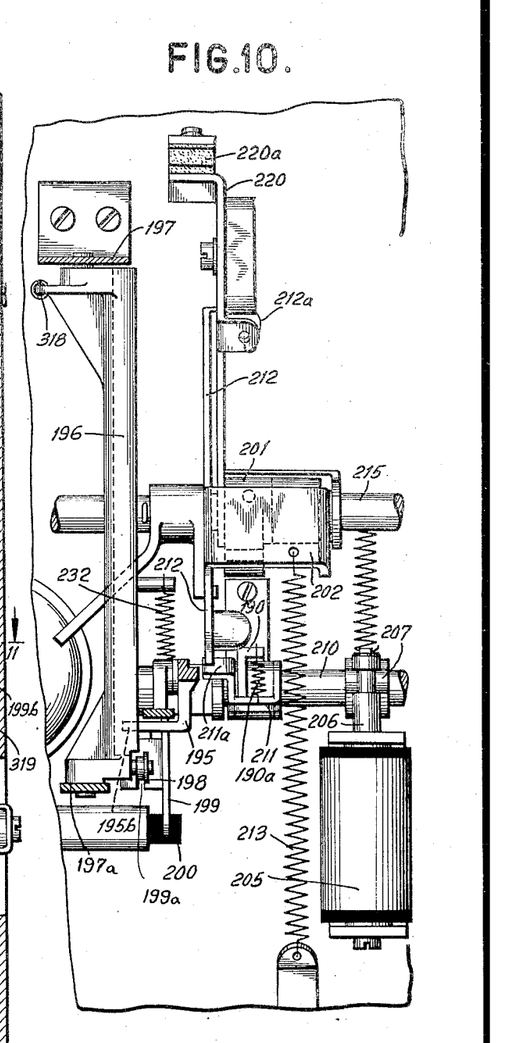
Fig. 10 is a sectional view on the line 10—10 of Fig. 9.
Figure 14:
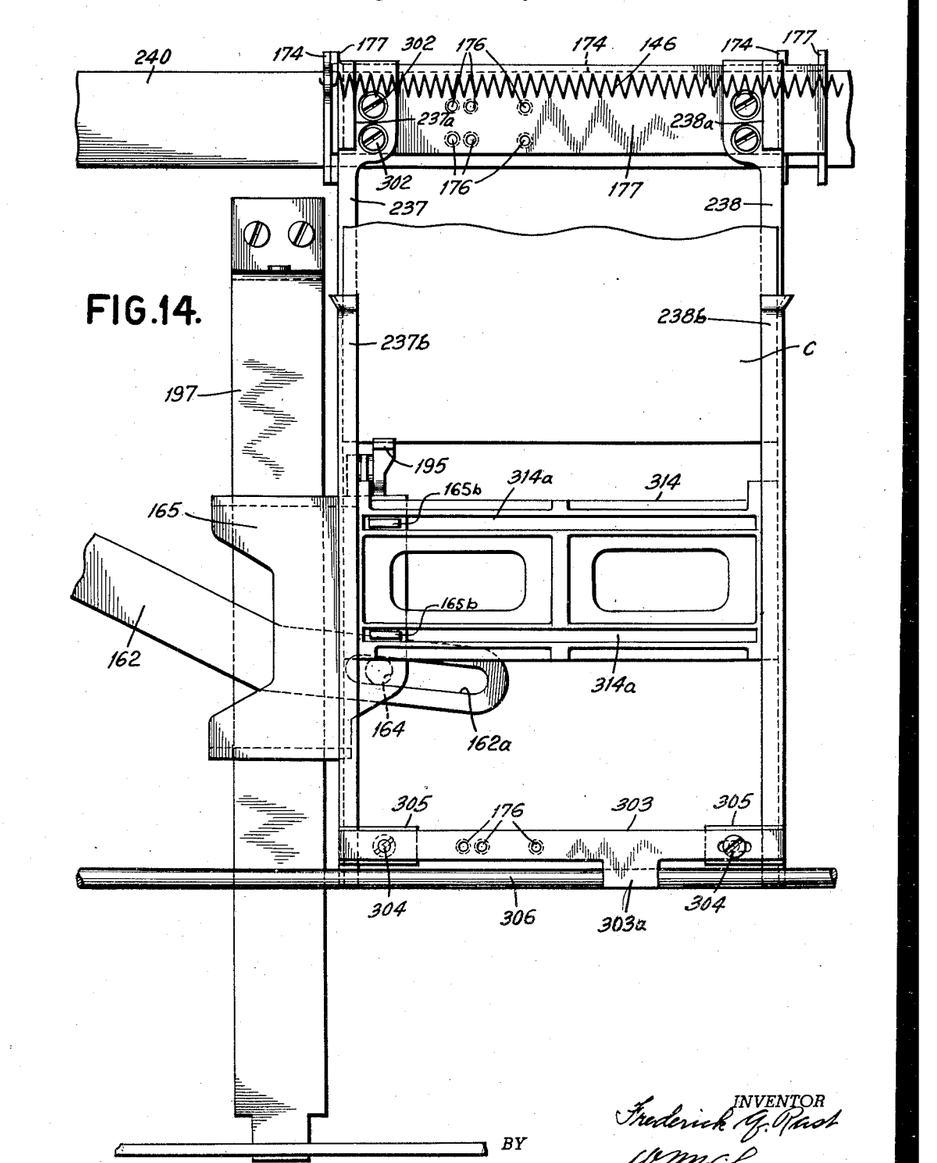
Fig. 14 is a front elevation of the card holder, carriage and abutment.

As shown best in Fig. 9, the card C is held by the card holder facing the type wheels, one of which appears in this view with the reference number 81. A ribbon 185 is fed between the card and the type wheels, by mechanism described in my Patent No. 2,281,998. Behind the card is a printing hammer 220 pivoted on a shaft 215 and carrying a rubber platen 220a (see also Fig. 10). The printing hammer is actuated by mechanism which will be described presently. This mechanism is tripped by a bell crank lever 195 pivoted at 195a upon a bracket 165a of a carriage 165. The carriage 165 is mounted to slide vertically upon a stationary bar 197 and thus to change the vertical position of the trip lever 195, with reference to the card holder. The carriage 165 also has two lugs 165b (Fig. 14) engaging in slots 314a of an abutment bar 314 vertically slidable in the channels 237b and 238b. The abutment bar 314 acts as a stop to the trip lever 195 and also limits the depth of penetration of the card into the card holder, to determine the line of the card at which the record is to be printed. The vertical movement of the carriage is effected by an arm 162 pivoted at 163 (Fig. 4) and having a slot 162a in its end to engage a stud 164 on the carriage 165. The arm 162 is positioned by a mechanism similar to that which operates the program arm 143. A ratchet wheel 153 rotatably mounted upon a stud 317 is moved step by step in clockwise direction by a pawl assembly 152, also revolubly mounted on stud 317. The pawl assembly is biased in counterclockwise direction by a spring 152b, so that its arm 152a normally rests upon a stop 151. The pawl assembly is rocked at intervals through link 157 by the motor 60, under control of the program drum 105. For a detailed description of the mechanism which reciprocates the link 157 at the proper time reference is made to my Patent No. 2,281,998. The ratchet wheel 153 has fixed to it a stepped cam 160, which is engaged by a cam follower 161 fixed to the arm 162. The cam is moved by steps, usually one step a day, and at each step the arm 162 lifts the carriage 165 and abutment bar 314, to stop the card one line higher in the card holder. After a certain number of upward steps, for instance seven, the cam follower 161 drops to the low part of the cam and the card abutment is positioned again at full depth.

Figure 2:
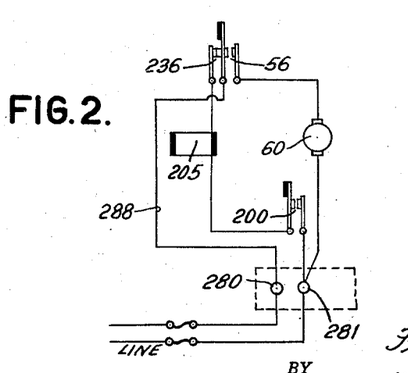
Fig. 2 is a partial circuit diagram of the machine.

The trip lever 195 has a lug 195b which travels in the channel of a bail 196 as the carriage 165 rises and falls. The bail 196 is pivoted on the bar 197 and a bracket 197a thereof and is biased by a spring 318 in the direction to hold the trip lever 195 in raised position. A thrust bar 198 articulated to the lower end of bail 196 extends into a slot 199a in a lug of a lever 199 revolubly mounted on a rock shaft 210. The lever 199 is biased by a spring 232 so that its arm 199b normally rests against a frame plate 319 and its lower end stands out in front of a pair of contacts 200. When the bar 198 is thrust to the rear by the trip lever 195 its shoulder 198a strikes the lug of the lever 199, rocks the lever, and closes the contacts 200. This completes the circuit of a solenoid 205 (Fig. 2), which circuit can be traced from a line terminal 280 through wire 288, normally closed contacts 236, solenoid 205, print contacts 200 when closed, to line terminal 281. The armature 206 of the solenoid 205 (Figs. 4, 5 and 10) is articulated to an arm 207 fixed on the rock shaft 210 and, when the solenoid is energized rocks the shaft counterclockwise (Fig. 5), against the pull of a spring 320. This has three results: First, the release of the printing hammer for a printing motion; second, the disabling of the card operated trip mechanism; third, the starting of the motor. These operations will now be described in order.

The shaft 210 has fixed to it an arm 190 (Figs. 9 and 10) straddled by a bail 211 free on the shaft 210 and biased against the arm by a spring 190a. The bail 211 has a lug 211a, which normally stands in front of the bottom end of a lever 212 rockably mounted on shaft 215 and biased in counterclockwise direction by a spring 213 connected to a yoke 202 of the lever. The printing hammer 220 is yieldably held against a lug 212a of the lever 212 by a spring 321. When the rocking of shaft 210 releases bail 211 from lever 212, the lever swings counterclockwise (Fig. 9) and throws the hammer toward the printing wheels; an adjustable buffer 219 stops the lever 212 just before the platen strikes the card and the hammer completes the printing stroke by its own momentum, tensioning spring 321.

Figures 8, 11, 12, 13:
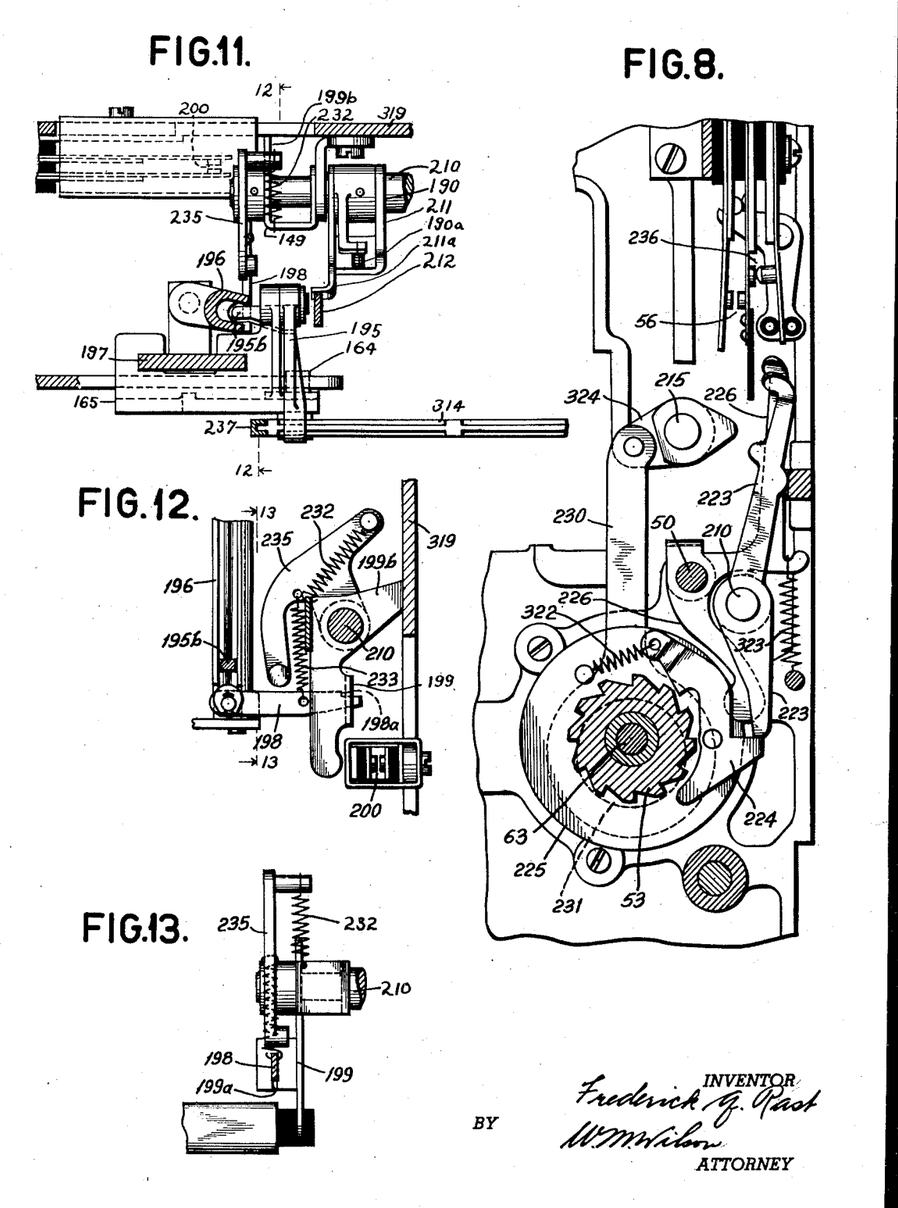
Fig. 8 is a section on the line 8—8 of Fig. 6.
Fig. 11 is a sectional view on the line 11—11 of Fig. 9.
Fig. 12 is a sectional view on the line 12—12 of Fig. 11, to bring out the detail of the print contact operating arm and knock-off.
Fig. 13 is a section on the line 13—13 of Fig. 12.

There is also fixed on shaft 210 a knock-off member 235 (Figs. 12 and 13). This member serves as an anchor for two springs, namely, the spring 232 previously referred to and a spring 233 which pulls the bar 198 up against the top of the slot 199a. When the shaft 210 rocks, by energization of the solenoid 205, the knock-off member strikes the bar 198 down, after the contacts 200 have been closed, and releases the shoulder 198a from the lever 199, which springs back to normal position and opens the contacts 200, breaking the circuit of solenoid 205 and allowing shaft 210 to restore to normal position. The lug 211a strikes the bottom end of lever 212, as the arm 190 tensions spring 190a slightly, pulling the bail 211 so that it will snap behind the lever 212, when the latter is restored, in a manner to be described presently.

Figures 6, 7:
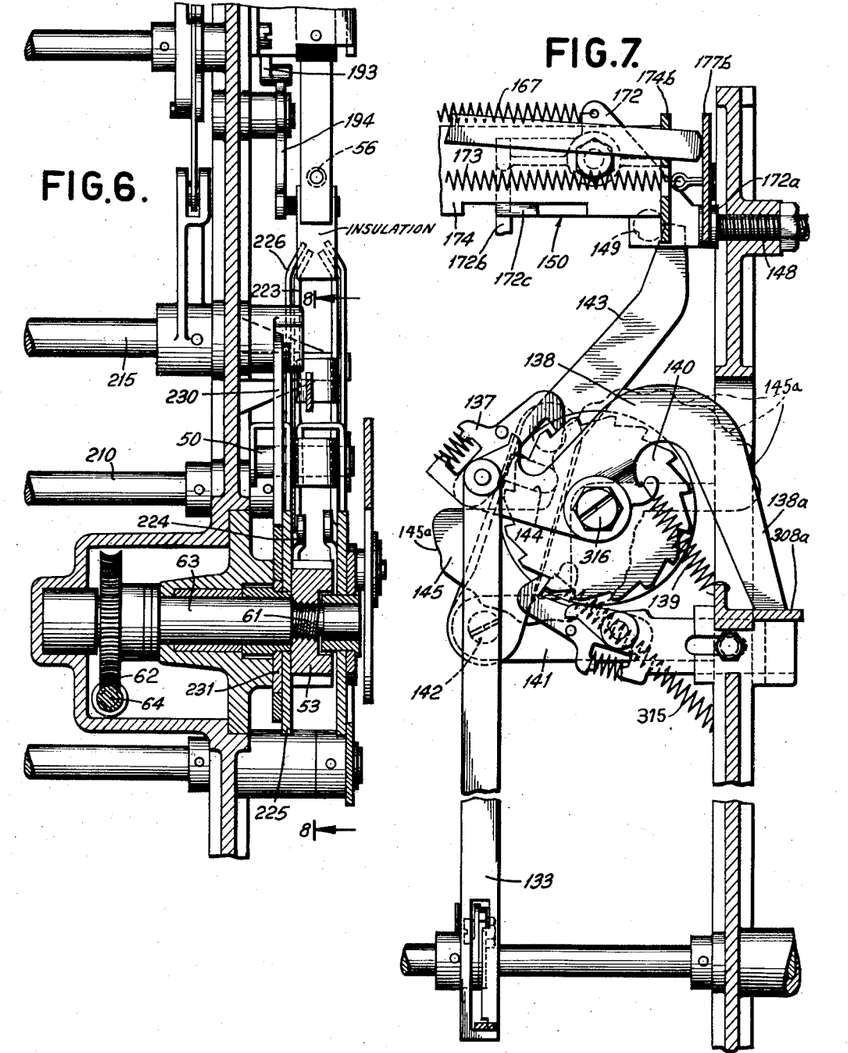
Fig. 6 is a sectional view of the motor drive mechanism taken along the line 6—6 of Fig. 3.
Fig. 7 is a front elevation of the carriage shift mechanism, with parts in section.

There is also fixed to shaft 210 a lever 223 (Figs. 6 and 8), the upper end of which closes a pair of contacts 56, when the shaft 210 is rocked by the solenoid 205. A glance at Fig. 2 will show that this completes the circuit of the motor 60. The contacts 236, previously mentioned, are broken at the same time, opening the circuit of solenoid 205. The motor shaft is coupled to a worm 64 (Fig. 3) meshing with a worm wheel 62 keyed to a main drive shaft 63 (Fig. 6). This shaft has a threaded portion 61 by which a ratchet wheel 53 is fastened to it. Revolubly mounted on shaft 63 beside the ratchet wheel 53 is a cam disk 225 carrying a pivoted pawl 224. The pawl is biased toward engagement with the ratchet 53 by a spring 322, but in the condition of rest of the machine is held out of engagement by the bottom end of latch lever 223. A contact holding lever 226 rockably mounted on a shaft 50 is biased against the cam 225 by a spring 323. When the pawl 224 is released by the latch 223 and engages the ratchet wheel 53, the cam 225 starts to revolve and throws lever 226 over to hold the contacts 56 closed and the contacts 236 open for one revolution of the cam. An eccentric 231 fixed to cam 225 reciprocates a link 230 engaged therewith by an eccentric strap. The link 230 is articulated to an arm 324 fixed to shaft 215 and thus rocks the shaft clockwise, during the first half revolution of eccentric 231. An arm 201 pinned to shaft 215 strikes the yoke 202 and rocks the lever 212 far enough for the arm 211 to snap behind its bottom end. The printing hammer is restored with the lever 212 by the spring 321. At the end of one revolution of the cam 225 the pawl 224 is unclutched by the latch 223 and the contact holding lever 226 drops into the recess of the cam 225, holding the latter stationary and releasing the contact 56, which breaks the motor circuit.

*Out-of-program printing control*

Figures 21, 22:
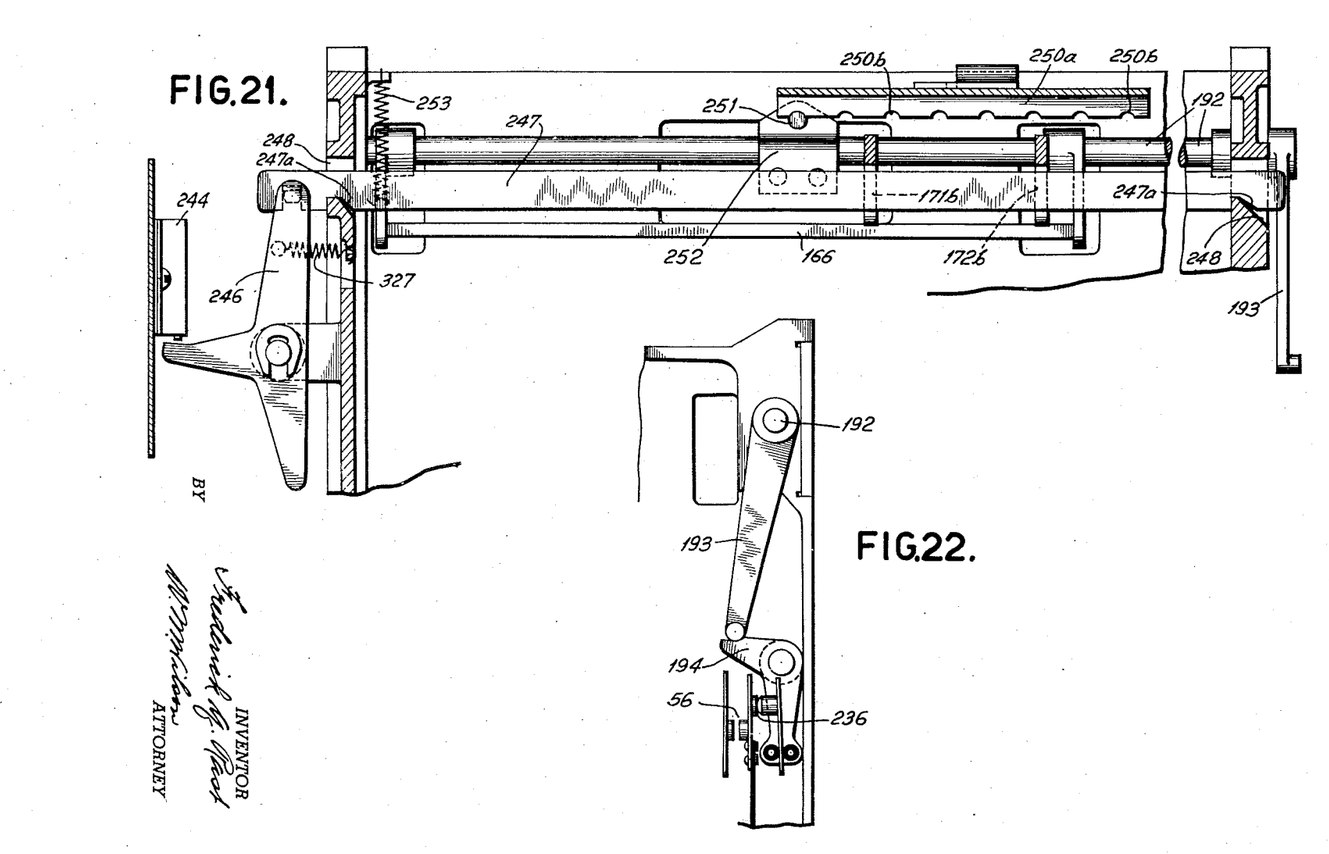
Fig. 21 is a sectional view on the line 21—21 of Fig. 15, showing the out-of-program print control mechanism.
Fig. 22 is a fragmentary side elevation showing a contact operating mechanism controlling the circuit of the print magnet.

Referring now to Figs. 21 and 22, it will be seen that the contacts 236, which it will be remembered, are in the circuit of the print magnet 205, are controlled by a bell crank lever 194, the position of which is, in turn, controlled by an arm 193 fixed to a shaft 192. If the shaft 192 is rocked counterclockwise (Fig. 22), the contacts 236 will be opened and the print solenoid 205 cannot be energized. The shaft 192 has fixed to it an arm 252 (see also Figs. 15 and 16) with a pin 251 biased against the downwardly turned rear flange 250a of the plate 250 by a spring 253 hooked into a fixed arm 325 on the shaft 192. The flange 250a has notches 250b into which the pin 251 can drop when the carriage 150 is in the corresponding printing positions. This allows the arm 193 to assume the position shown in Fig. 22, which allows the contacts 236 to close. When the carriage is in such a position that the pin 251 stands between two notches 250b, the contacts 236 will be held open and the print magnet cannot be energized. Thus each time the carriage 150 shifts to a new printing position the arm 193 is rocked to open the contacts 236, until the pin 251 drops into the next notch 250b.

The mechanism just described thus constitutes a print control means.

Figures 15, 16, 17:
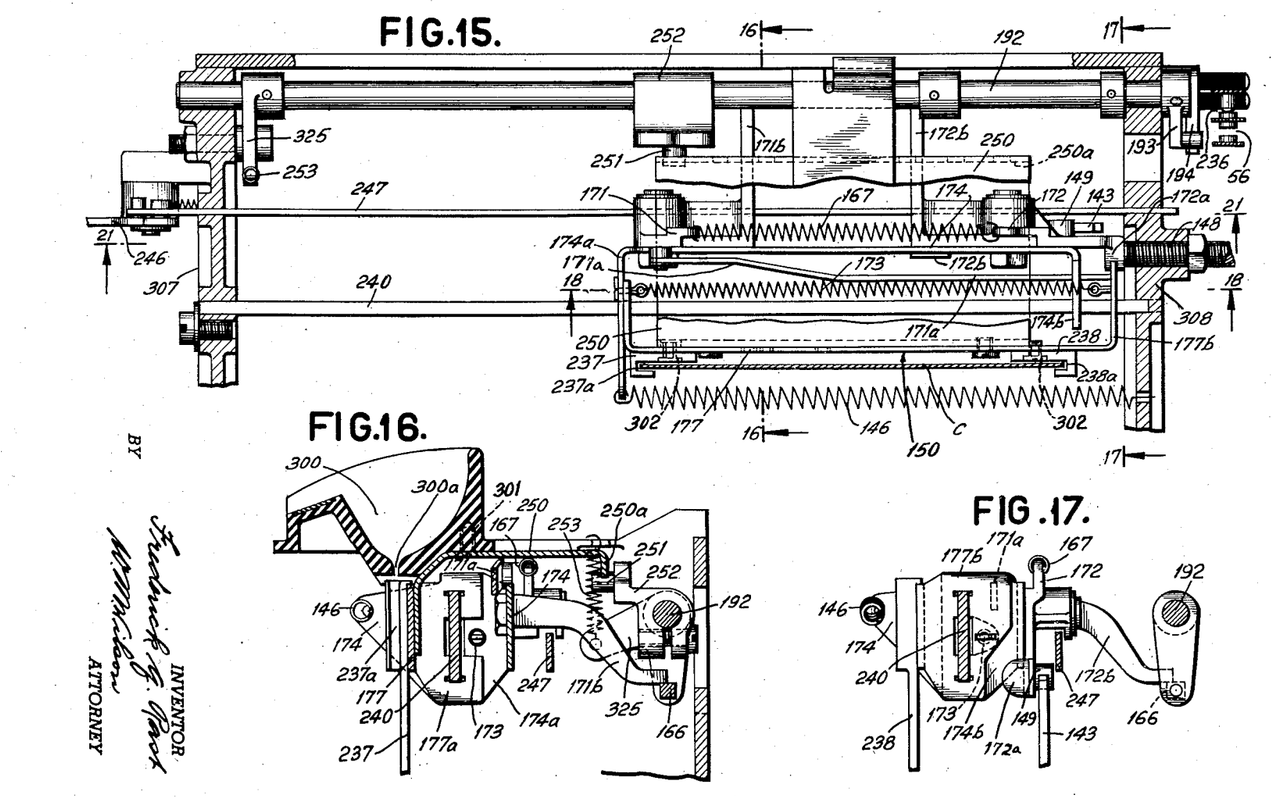
Fig. 15 is a sectional plan view of the carriage and associated mechanism.
Figs. 16, 17, and 18 are sectional views taken, respectively, on the lines 16—16, 17—17, and 18—18 of Fig. 15.
Figure 18:
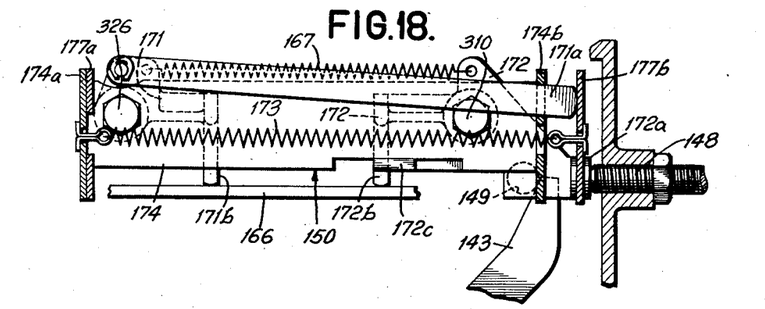

Means are provided to prevent unauthorized out-of-program printing, by blocking the entry of the pin 251 into any notch 250b except the one pertaining to the printing position determined by the program mechanism. Referring particularly to Figs. 15 to 20, it will be noted, that in addition to the lever 172, the plate 174 has a lever 171 pivoted to it by a pin 326. The levers 171 and 172 are interconnected by a spring 167 tending to rock them in clockwise and counterclockwise directions, respectively. The lever 171 has articulated to it a thrust bar 171a which extends through a slot in the ear 174b, for engagement by the ear 177b. When the two parts of the carriage 150 are in the contracted position shown in Fig. 18, the lever 171 is rocked back against the action of spring 167 by the thrust bar 171a, spring 173 being stronger than spring 167. In this position an arm 171b (Fig. 16) of the lever stands above the cross bar of a bail 166 fixed to shaft 192. If the card holder is pulled to the right, only the plate 177 of the carriage will move with it, the plate 174 being held by the program arm 143. This condition is shown in Fig. 20, where the bar 171a, released by the ear 177b, has moved to the right and allowed the lever 171 to rock down so that its arm 171b stands in front of the cross bar of the bail 166. Referring to Fig. 16, it will be seen that as the pin 251 is rocked down by the flange 250a, the bail 166 rocks out and allows the arm 171b to drop into position to block the return of the bail. Only when the card holder is restored to in-program position and the lever 171 is rocked back, can the bail 166 return to normal position and close the contacts 236.

Figure 19:
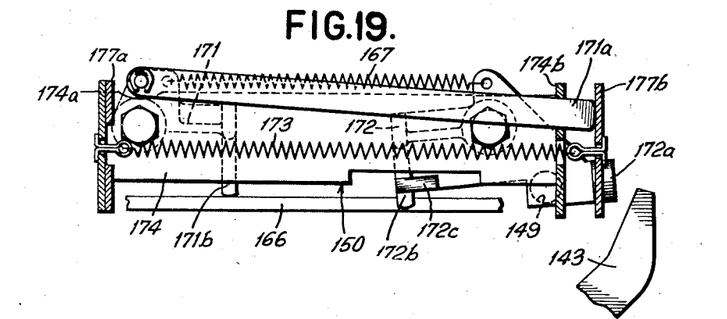
Figs. 19 and 20 are views similar to Fig. 18 showing the parts in the positions assumed when the card holder is pulled to the left and to the right, respectively, from on-program position.
Figure 20:
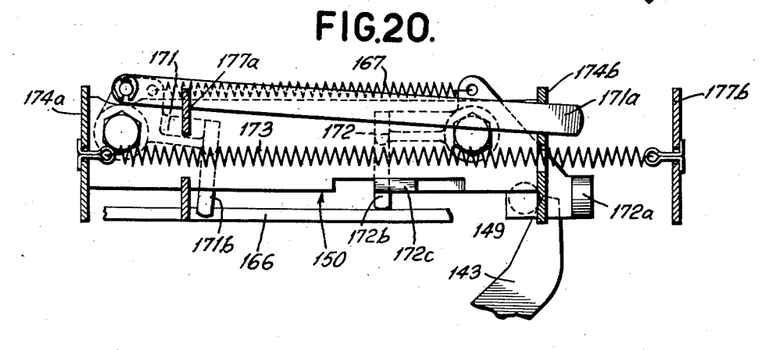

On the other hand, if the card holder is pulled to the left from program position, the stud 149 will leave the program lever 143 and the lever 172 will rock down to the position shown in Fig. 19. Its arm 172b will then block the bail 166 in the same way as the arm 171b of lever 171.

Means are provided to prevent operation of the out-of-program blocking means just described, so that under authorized conditions a record can be made out of program. A bar 247 is mounted in slots 248 of the side plates 307 and 308, so as to be just under the levers 171 and 172. The bar can be moved to the left by a lever 246, against the action of a spring 327. By this movement the bar is cammed upward by its inclined surfaces 247a (Fig. 21) and lifts the levers 171 and 172 to inoperative position. The lever 246 can be rocked by means of a key inserted in lock 244. The pin 251 can then move into any one of the notches 250b, as the card holder is shifted to an out-of-program printing position, closing the contacts 236 and setting up the print magnet circuit. The pin 251 registers the card holder in the manually selected printing position.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a time recording machine, printing means, a card holder for positioning a card inserted therein to receive a record from said printing means, said card holder being mounted so as to be movable laterally with respect to said printing means, progressively moving means to shift said card holder laterally to different printing positions, means yieldably holding said card holder at the position determined by said progressively moving means, print control means, and disabling means operatively associated with said print control means and rendered effective by movement of said card holder to any position other than the one determined by said progressively moving means, to hold said print control means in non-print condition until said cardholder is returned to the printing position determined by said progressively moving means.

2. A machine as described in claim 1, having key operated means for locking out said disabling means.

3. In a time recording machine, printing means, a card holder for positioning a card inserted therein to receive a record from said printing means, a two part carriage on one part of which said card holder is mounted, a program member against which the other part of said carriage is yieldably held to determine the in-program position of the carriage, said carriage being mounted to shift in relation to said printing means in a direction parallel to the face of a card in said holder, the two parts of said carriage being relatively movable in the direction in which the carriage shifts and having means for yieldably holding the same in relatively contracted position, print control means, and disabling means operatively associated with said print control means and rendered effective by relative movement of the parts of said carriage or by movement of the carriage as a whole with respect to said program member, to hold said print control means in non-print condition.

4. A machine as described in claim 3, having key operated means for locking out said disabling means.

5. A machine as described in claim 1, wherein said disabling means comprises yielding means tending to restore the disabling means to ineffective position upon the return of said card holder to the position determined by said progressively moving means.

6. In a time recording machine, printing means, a card holder for positioning a card inserted therein to receive a record from said printing means, said card holder being mounted so as to be movable laterally with respect to said printing means, progressively moving means to shift said card holder laterally to different printing positions, means yieldably holding said card holder at the position determined by said progressively moving means, print control means yieldably held in print condition when said card holder is in any one of said printing positions and movable to non-print condition by the travel of said card holder between said printing positions, and disabling means operatively associated with said print control means and rendered effective by movement of said card holder to any position other than the one determined by said progressively moving means, to hold said print control means in non-print condition until said card holder is returned to the position determined by said progressively moving means.

7. A machine as described in claim 6, having key controlled means for locking out said disabling means, whereby said print control means will assume print condition upon movement of said card holder to any one of said printing positions.

8. In a time recording machine, printing means, a carriage composed of a positioning part and a card holding part, means yieldably holding said parts in contracted relation, print control means, disabling means comprising a pair of blocking members movably mounted on the positioning part of said carriage and each adapted, in blocking position, to hold said print control means in non-print condition, means biasing said blocking members toward blocking position, a program member, means biasing said carriage in one direction to press one of said blocking members against said program member, thereby to hold said last mentioned blocking member in non-blocking position and said carriage in a printing position, and means operated by the positioning of the two parts of said carriage in their most contracted relation to hold the other of said blocking members in non-blocking position, whereby upon movement of said carriage as a whole in one direction said first mentioned blocking member will be removed from said program member and allowed to assume its blocking position, and upon movement of the card holding part of said carriage alone in the opposite direction said other blocking member will be released for movement to blocking position.

9. In a time recording machine, printing means, a card holder for positioning a card inserted therein to receive a record from said printing means, said card holder comprising a pair of opposed lateral guide members and adjustable means for holding said members parallel at a selected distance, program means for moving said card holder laterally by steps, and adjustable abutment means to determine a limit position of said card holder, the limit position allowing for movement of said card holder with said program means through all, or less than all of the steps of movement of said program means, in dependence upon the adjustment of said abutment means.

FREDERICK Q. RAST.